(12) United States Patent
Downs et al.

(10) Patent No.: US 7,776,293 B2
(45) Date of Patent: Aug. 17, 2010

(54) LOW-TEMPERATURE, MOVING BED CATALYTIC REACTOR FOR CONTROL OF $NO_x$ EMISSIONS FROM COMBUSTION

(75) Inventors: William Downs, Alliance, OH (US); Seyed B. Ghorishi, Uniontown, OH (US); Ralph T. Bailey, Uniontown, OH (US); Kevin J. Rogers, Wadsworth, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 0 days.

(21) Appl. No.: 12/175,540

(22) Filed: Jul. 18, 2008

(65) Prior Publication Data

US 2009/0035200 A1 Feb. 5, 2009

Related U.S. Application Data

(60) Provisional application No. 60/953,608, filed on Aug. 2, 2007.

(51) Int. Cl.
*B01D 53/34* (2006.01)
*B01D 53/56* (2006.01)
*B01D 53/74* (2006.01)
*B01D 53/83* (2006.01)

(52) U.S. Cl. .............. 423/210; 423/215.5; 423/239.1; 422/139; 422/144; 422/168; 422/169; 422/177; 422/181

(58) Field of Classification Search ............ 423/210, 423/215.5, 239.1; 422/139, 144, 168, 169, 422/177, 181
See application file for complete search history.

(56) References Cited

U.S. PATENT DOCUMENTS

| | | | |
|---|---|---|---|
| 5,167,931 A | 12/1992 | Downs | |
| 5,169,607 A | 12/1992 | Krambrock et al. | |
| 5,266,288 A | 11/1993 | Downs | |
| 5,624,644 A | 4/1997 | McKenna et al. | |
| 5,647,892 A | 7/1997 | McKenna et al. | |
| 2002/0150516 A1* | 10/2002 | Pahlman et al. | 422/171 |

OTHER PUBLICATIONS

Long et al., Selective Catalytic Reduction of NO with Ammonia over FE3+ Exchanged Mordenite (Fe-MOR): Catalytic Performance, Characterization, and Mechanistic Study, Journal of Catalysis, vol. 207, 274-285, 2002, Elsevier Science (USA).

(Continued)

*Primary Examiner*—Timothy C Vanoy
(74) *Attorney, Agent, or Firm*—Eric Marich

(57) ABSTRACT

An apparatus for low-temperature $NO_x$-reduction is disclosed, which is useful in boiler installations used at electric-generating plants. The apparatus employs one or a plurality of moving-bed reactors wherein a moving bed of common base-metal catalyst is used for selective catalytic reduction of $NO_x$ present in flue gas. The moving bed permits continuous introduction of fresh or regenerated catalyst, thus obviating the conventional problems of sulfur-poisoning and consequent reduction in catalytic activity with such catalysts. Due to the lower activation energies of such catalysts, an SCR utilizing the moving-bed reactors disclosed herein can be located downstream of the air heater, further improving electric-generating efficiency. Methods for low-temperature $NO_x$ reduction are also disclosed.

34 Claims, 8 Drawing Sheets

OTHER PUBLICATIONS

Chen et al., Reduction of NOx over Zeolite MFI Supported Iron Catalysts: Nature of Active Sites, Phys. Chem. Chem. Phys, 2, 3083-3090, 2000, The Owner Societies.

Moreno-Tost et al., Selective Catalytic Reduction of Nitric Oxide by Ammonia Over Cu-Exchanged Cuban Natural Zeolites, Applied Catalysis B: Environmental, 50, (2004), 279-288, Elsevier Science B.V.

Yokomichi et al., Theoretical and Experimental Study on Metal-Loaded Zeolite Catalysts for Direct NOx Decomposition, Applied Catalysis B: Environmental, 28, (2000), 1-12, Elsevier Science B.V.

Ghorishi, Fundamentals of Mercury Speciation and Control in Coal-Fired Boilers, EPA-600/R-98-014, Feb. 1998, Prepared for US Environmental Protection Agency, Washington, D.C.

Ghorishi, Study of the Fundamentals of Mercury Speciation and Control in Coal-Fired Boilers Under Simulated Post-Combustion Conditions, EPA-600/R-99-026, Mar. 1999, Prepared for US Environmental Protection Agency, Washington, D.C.

Ghorishi et al., Effects of Fly Ash Transition Metal Content and Flue Gas HCL/SO2 Ratio on Mercury Speciation in Waste Combustion, Environmental Engineering Science, vol. 22, No. 2, 2005, (c) Mary Ann Liebert, Inc.

Nieken, et al., Periodic Operation of the Deacon Process, Chemical Engineering Science, 54, (1999), 2619-2626, Elsevier Sciencee Ltd.

Teng et al., Catalytic Reduction of NO with NH3 over Carbons Impregnated with Cu and Fe, Environmental Science & Technology, vol. 35, No. 11, 2369-2374, 2001, American Chemical Society, USA.

* cited by examiner

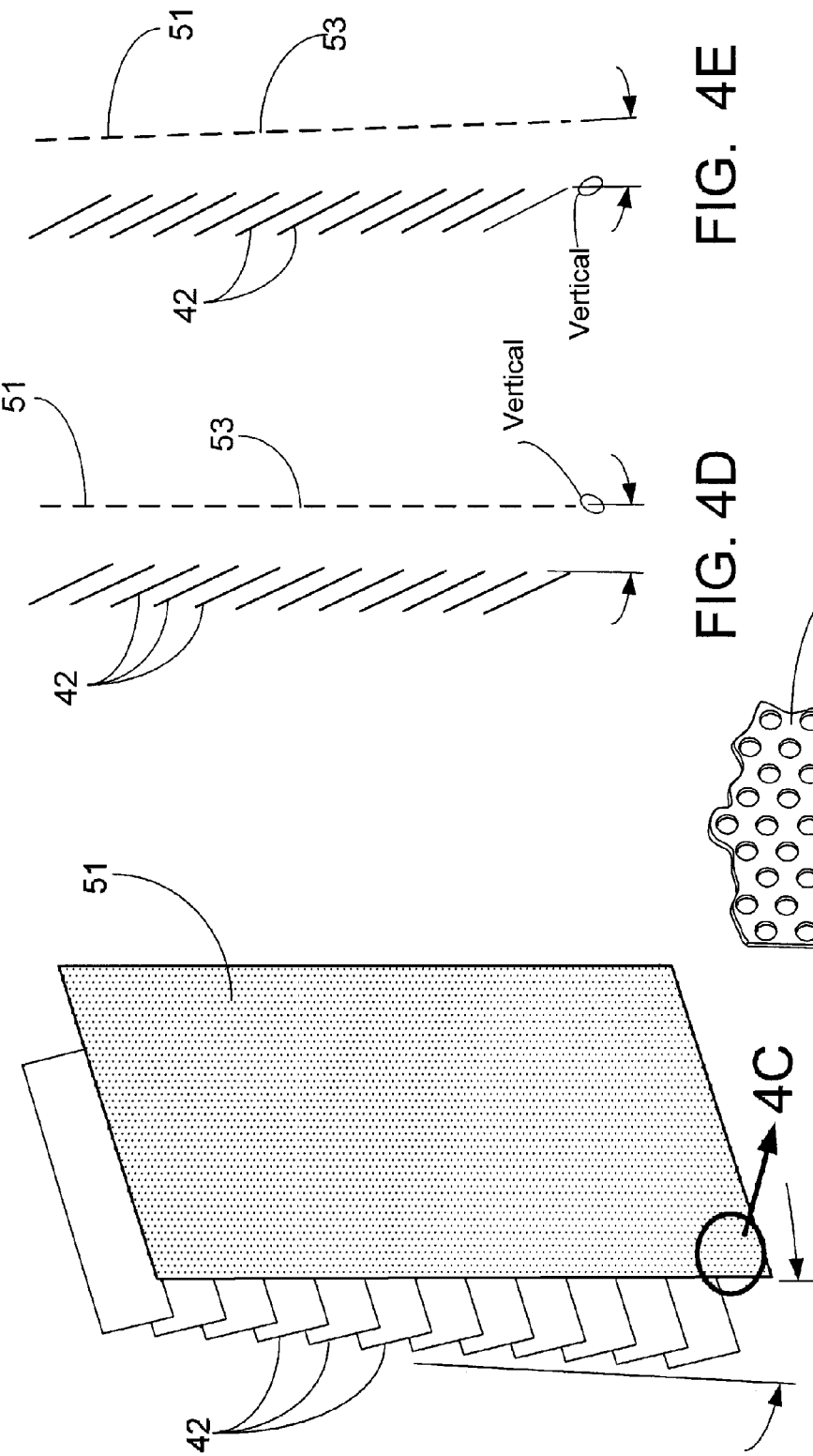

LOW-TEMPERATURE, MOVING BED CATALYTIC REACTOR FOR CONTROL OF $NO_x$ EMISSIONS FROM COMBUSTION

CROSS-REFERENCE TO RELATED APPLICATION

This application claims the benefit of U.S. Provisional Patent Application Ser. No. 60/953,608 filed Aug. 2, 2007, which is incorporated herein by reference.

FIELD AND BACKGROUND OF THE INVENTION

This invention relates to selective catalytic reduction of $NO_x$ present in flue gas from combustion, for example coal combustion in power-generation plants. More particularly, it relates to selective catalytic reduction of $NO_x$ at low temperatures.

Selective Catalytic Reduction, SCR, technology is used worldwide to control $NO_x$ emissions from combustion sources at higher temperatures (550-750° F.). SCR/direct destruction of $NO_x$ and catalytic oxidation of $Hg^0$ at low temperature (below 350° F.) is a relatively new field awaiting major breakthroughs to reach commercial viability.

High temperature SCR technology has been used in Japan for $NO_x$ control from utility boilers since the late 1970's, in Germany since the late 1980's, and in the US since the late 1990's. The function of the SCR system is to react $NO_x$ with ammonia ($NH_3$) and oxygen to form molecular nitrogen and water. Industrial scale SCR's have been designed to operate principally in the temperature range of 500° F. to 900° F. but most often in the range of 550° F. to 750° F. Catalysts used in this application are sulfation-resistant metals such as vanadium, titanium and tungsten and a variety of their oxides. As used herein, a sulfation-resistant metal is one that resists reaction (or that does not readily react) with sulfur-containing species such as sulfates and sulfur-based acidic gases to form metal-sulfur (sulfate or sulfite) salts. Such sulfation-resistant metals and select oxides can support redox reactions while still being resistant to forming sulfur-based salts. These catalysts are generally preferred because they exhibit good resistance to sulfur poisoning. Other researchers in this field (Teng et al., 2001; Long et al., 2002; Chen et al., 2000; Moreno-Tost et al., 2004) have identified several metals and their oxides that showed catalytic qualities for SCR, including chromium, manganese, iron, cobalt, nickel, copper, and zinc. While these catalysts are effective for SCR-$NO_x$ reduction at lower temperatures (e.g. 350° F. or lower), they are also subject to sulfur poisoning; i.e. they are not sulfation-resistant. Such metals (and their oxides) that are not sulfation-resistant are referred to herein as common base metals. Conversely, even though conventional SCR catalysts are resistant to sulfur poisoning, they are generally ineffective at lower temperatures due to their low reactivity at the low temperature ranges (260-350° F.).

The application of base metal compounds for combined $SO_x$ and $NO_x$ control has been studied and to a limited extent practiced for three decades, although the focus has been on $SO_x$ removal. These systems operated generally in the same temperature regime as the conventional SCR (550° F. to 750° F.), and utilized means to regenerate the metal compounds after they reacted to remove $SO_x$ from the flue gas, to produce various sulfur products that could be separately removed or disposed of, such as sulfur, sulfuric acid, and ammonium sulfate. As noted above, the focus of these processes was $SO_2$ capture, with $NO_x$ capture a secondary effect. By contrast, the present invention aims particularly to reduce or destroy $NO_x$ in flue gas, as well as mercury oxidation. Sulfur capture to the extent that it happens in the novel SCR constructions disclosed herein, within the prevailing low temperature range, would be considered an interferent in the following description.

Very little is known on the direct catalytic destruction of $NO_x$ in the absence of $NH_3$. Yokomichi et al. (2000) presented results on direct $NO_x$ decomposition by copper-exchanged zeolites at high temperatures (570-1110° F.). The presence of oxygen in the flue gas and lowering the catalyst temperature had a negative impact on the activity of these catalysts.

Catalytic oxidation of $Hg^0$ to its oxidized forms ($Hg^{2+}$) is of interest due to the solubility and ease of control of $Hg^{2+}$ in wet scrubbers. Ghorishi (1998) studied the effect of several common metal oxide catalysts on $Hg^0$ oxidation. That study suggested that cupric oxide (CuO) and ferric oxide ($Fe_2O_3$) are very active in promoting the oxidation of $Hg^0$ in the presence of hydrogen chloride (HCl) in the flue gas. CuO exhibited a much higher activity in that work. The $Hg^0$ oxidation activities of these two metals were hypothesized to be caused by the Deacon process in which chlorine gas ($Cl_2$) is catalytically produced from HCl over these two oxides. $Hg^0$ was then oxidized by reacting with $Cl_2$ in the vicinity of the surface of the catalyst. In a follow up study, Ghorishi (1999) showed that cuprous chloride (CuCl) has a far superior catalytic activity than CuO. It was found that CuCl was so reactive that it caused the oxidation of $Hg^0$ even in the absence of HCl in the flue gas. In a later study, Ghorishi et al (2005) used a two-step global Deacon reaction scheme (Nieken and Watzenberger, 1999) to explain the superior activity of CuCl. This two-step mechanism divides the Deacon process into a chlorination step (which results in the formation of an intermediate surface species, $CuCl_2$ or perhaps CuCl, and the release of gas-phase $H_2O$) and a dechlorination step (which results in the formation of $Cl_2$ and the regeneration of the original CuO catalysts):

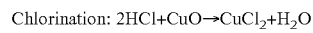

Chlorination: $2HCl+CuO \rightarrow CuCl_2+H_2O$

Dechlorination: $2CuCl_2+O_2 \rightarrow 2CuO+2Cl_2$

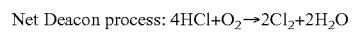

Net Deacon process: $4HCl+O_2 \rightarrow 2Cl_2+2H_2O$

Ghorishi et al. (2005) hypothesized that by using a copper chloride catalyst the chlorination step and thus the presence of HCl in flue gas would no longer be needed. Elimination of the chlorination step would also lead to a faster $Hg^0$ oxidation reaction and thus the superior activity of the CuCl catalyst. It should be noted that in the case of $CuCl_2$/CuCl catalyst and the absence of HCl in the flue gas, there would be no regeneration and the catalyst would be eventually exhausted to CuO. At that time, the chlorination step would become important and the presence of HCl may be needed to regenerate the copper chloride catalyst material according to the Chlorination reaction shown above.

$SO_2$ poisoning of CuCl and/or $CuCl_2$ is also major concern regarding activity of $Hg^0$ oxidation catalyst. As noted above in the context of $NO_x$ reduction, some transition metal compounds such as CuCl and $CuCl_2$ are susceptible to sulfur poisoning, which can result in production of the metal sulfate and depletion of the useful catalyst material (metal halide).

Accordingly, an apparatus and method for the continuous regeneration of the these-metal oxide catalysts (or the continuous introduction of fresh catalyst) is desirable to reverse or minimize the effects of sulfur poisoning. Such a system would enable sulfation prone metal or metal oxide catalysts to be used in low-temperature $NO_x$-reduction and Hg-oxidation reactors, such as in a low-temperature SCR operating in an electric power generation plant. Operating the SCR at low temperature would open up a broad range of boiler-installation designs (including SCR-retrofit locations) that would no longer require the SCR to be located upstream of the air heater (which preheats combustion air entering the boiler via heat exchange with exiting flue gas) relative to the flue-gas flow path.

SUMMARY OF THE INVENTION

Accordingly, one aspect of the present invention is drawn to an apparatus which includes a combustion chamber for combustion of a fuel, which during operation generates a flue gas that may contain a quantity of $NO_x$ that it is desired to remove; and a SCR reactor for reducing at least a portion of $NO_x$ present in the flue gas.

The SCR reactor has a moving-bed reactor that comprises first and second opposed boundaries spaced apart from one another to thereby define a substantially vertical catalyst-bed pathway therebetween. Flue gas traveling through the moving-bed reactor follows a path through the bed pathway.

More particularly, another aspect of the present invention involves an SCR reactor has a moving-bed reactor that includes first and second opposed louver stacks, wherein each of the louver stacks has a series of vertically-spaced first or second louvers, respectively. The first and second louvers in the respective first and second louver stacks are inclined away from one another, and the first and second louver stacks are spaced apart from one another to thereby define a substantially vertical catalyst-bed pathway there between. Flue gas traveling through the moving-bed reactor follows a path between the vertically-spaced first louvers, through the bed pathway, and then exiting between the vertically-spaced second louvers.

Alternatively, the first and second opposed boundaries may comprise, respectively, a first louver stack disposed adjacent an inlet of said reactor and a perforated plate disposed adjacent an outlet of said reactor. The catalyst-bed pathway is defined between the first louver stack and the perforated plate.

Still further, the first and second opposed boundaries may comprise, respectively, first and second perforated plates, the catalyst-bed pathway being defined between the first and second perforated plates.

Yet another aspect of the present invention is drawn to a method to treat flue gas exiting a combustion chamber to remove $NO_x$ therein, which includes the following steps: providing a moving-bed reactor that has first and second boundaries defining a substantially vertical catalyst bed pathway therebetween. The first and second boundaries may comprise opposed louver stacks, wherein each of the louver stacks includes a series of vertically-spaced first or second louvers, respectively, and wherein the first and second louvers in the respective first and second louver stacks are inclined away from one another, and wherein the first and second louver stacks are spaced apart from one another to thereby define a substantially vertical catalyst-bed pathway therebetween; providing a bed of catalyst particles flowing downward through the catalyst-bed pathway and guided by the opposed first and second louver stacks; and flowing at least a portion of the flue gas exiting the combustion chamber along a pathway through the moving-bed reactor such that it travels between the vertically-spaced first louvers, through the bed pathway, and then exits between the vertically-spaced second louvers. Alternatively, the first and second opposed boundaries may comprise, respectively, a first louver stack disposed adjacent an inlet of said reactor and a perforated plate disposed adjacent an outlet of said reactor, or they may comprise, respectively, first and second perforated plates. The catalyst-bed pathway is defined between the first louver stack and the perforated plate, or between the first and second perforated plates.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

BRIEF DESCRIPTION OF THE DRAWINGS

FIG. 4B is a perspective view of an alternative embodiment of the moving-bed reactor of FIG. 4, wherein perforated plate is substituted for the louver arrangement at the downstream side;

FIG. 4C is an enlarged view of a portion of the perforated plate of FIG. 4B;

FIGS. 4D through 4F are end views of the embodiment of FIG. 4B, respectively illustrating how the inlet louvers, (FIG. 4D), outlet perforated plate, (FIG. 4E), or both (FIG. 4F) may be slightly sloped from vertical in order to enhance solids flow down through the moving-bed reactor;

DESCRIPTION OF PREFERRED EMBODIMENTS

As used herein, when a range such as 5-25 (or 5 to 25) is given, this means preferably at least 5 and, separately and independently, preferably not more than 25. Also as used herein, in addition to disclosing the endpoints, every numerical range shall and is intended to constitute a disclosure of all intermediate values within that range. For example, the range 5-25 is also intended to disclose all values therebetween, e.g. 7, 9, 12, 13.9, 17.25, etc.

One feature of this invention provides means whereby catalysts effective at low temperatures but subject to chemical deactivation (e.g. through sulfur poisoning) over time can be used to catalyze the reduction of oxides of nitrogen at low temperatures, such as in the range of 250° F. to 350° F., or any range therewithin. This is the temperature range typical of flue gases from modern fossil fuel fired power plants in the region between the air heater and the flue gas desulfurization apparatus; i.e. downstream of the air heater in the direction of flue-gas flow. In preferred embodiments, such catalysts can simultaneously be used to oxidize elemental mercury to higher oxidation states (e.g. $Hg^{2+}$) that are easier and safer to handle or remove, also in the same temperature ranges. In certain embodiments, different catalysts can be used for each of these reactions, in which case a combination of catalysts would or may be used in the same reactor, such as a low-temperature SCR reactor in an otherwise conventional boiler installation. Alternatively, the same metal or metal oxide catalysts could be used to achieve both $NO_x$-reduction and Hg-oxidation.

Figure 1:
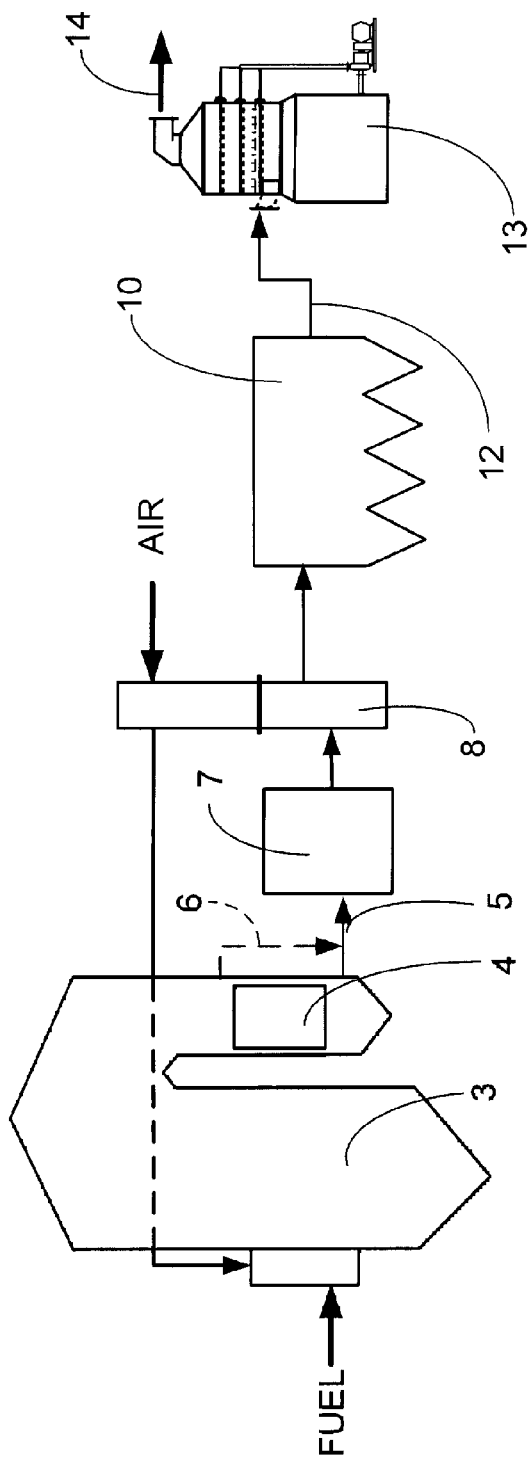
FIG. 1 is a schematic view of a conventional boiler installation as may be found in an electric-generating plant.

Referring to the drawings generally, wherein like reference numerals designate the same or functionally similar elements throughout the several drawings, and to FIG. 1 in particular, FIG. 1 illustrates a typical boiler installation in a power plant, including a conventional selective catalytic reduction reactor (SCR), in the conventional location between the boiler exit and the air heater, in-line with the flue-gas stream. That is, conventionally the SCR is placed between the boiler 3, and the air heater 8. This is done to ensure that the catalyst will operate at sufficiently high temperature to achieve adequate catalytic activity for the conventionally-used sulfation-resistant catalysts based on vanadium or tungsten. Most SCR catalysts used today have a minimum use temperature of about 550° F. At full load the temperature of the flue gas 5 leaving the economizer 4 will be in the vicinity of 650° F. to 700° F. But at low loads the temperature leaving the economizer could easily fall below the effective use temperature of these sulfation-resistant catalysts. So, to ensure the flue gas temperature entering the SCR is within the necessary temperature range so the sulfation-resistant catalysts will be effective, some hot flue gas 6 is drawn around (bypasses) the economizer and mixes with the flue gas leaving the economizer. This conventional feature is also illustrated in FIG. 1. Not only does this create a power penalty, it greatly increases the complexity to retrofit an existing boiler installation to include an SCR, because the bypass pathway must be installed.

As a result of the $NO_x$ SIP call of 1998, SCR's were installed on a number of existing coal-fired power plants in the U.S. In virtually every case the retrofit was difficult to engineer and erect. Retrofit refers here to the process of modifying existing equipment and/or adding new equipment to an existing boiler. The difficulty arises from the fact that the boiler is generally close-coupled to the air heater and frequently requires changes to the pressure parts on the boiler.

The $NO_x$ reduction efficiency across an SCR is generally expressed by the following relationship:

$$eff = 1 - e^{-ka_p\tau} \quad (1)$$

where
k=reaction rate constant
$a_p$=interfacial surface area of the catalyst, area per unit volume of reactor
$\tau$=residence time.

The reaction rate constant will depend upon the activity of the catalyst and upon the temperature of the reactor. The temperature dependence of reactivity follows the well known Arrhenius' Law:

$$k = Ae^{-E_a/RT} \quad (2)$$

where
$E_a$=activation energy, j/mol
R=the gas constant, j/mol ° K
A=proportionality constant
T=reactor temperature, ° K The activation energy for conventional sulfation-resistant SCR catalyst is around 46,000 j/mol. The change in reaction rate constant between say 600° F. (588° K) and 300° F. (422° K) can be computed by:

$$\ln\left[\frac{k_2}{k_1}\right] = \frac{E}{R}\left[\frac{1}{T_1} - \frac{1}{T_2}\right] = \frac{46,000}{8.314472}\left[\frac{1}{588} - \frac{1}{422}\right] = -3.701 \quad (3)$$

$$\frac{k_2}{k_1} = e^{-3.701} = 0.0247 \quad (4)$$

This calculation shows that conventional SCR catalysts would be only about 2.5% as effective at 300° F. as they would be at 600° F. Therefore, an SCR that was 90% efficient at 600° F. would be only 2.25% efficient at 300° F. So, to achieve $NO_x$ control at 300° F. there are two basic approaches. Either more reactive catalysts such as the noble metals platinum or palladium must be used, or the product $a_p\tau$ (see Eq. 1) must be significantly increased. The former approach requires more costly catalysts, while the latter can be achieved by increasing the catalyst volume. The approach utilized herein follows the latter option. In the below-disclosed embodiments, a significant portion of the volume of an SCR reactor can be filled with catalyst while allowing the flue gas to pass through and achieve intimate contact with the catalyst particles, while preferably also maintaining the pressure drop across the catalyst bed in the SCR at levels substantially equal to or below conventional monolith catalysts utilized in a typical SCR. An additional feature includes means for continuous withdrawal and regeneration of these catalysts for continuous reuse. This permits substantially lower-cost materials (e.g. common base metal compounds) to be used as SCR catalysts, even though they are susceptible to sulfur poisoning over time. This is a desirable feature, especially considering the greater volumes of catalyst material that are used to increase the quantity $a_p\tau$ described above. Common base metal compounds would include primarily compounds of chromium, manganese, iron, cobalt, nickel, copper, zinc and tin.

In summary, in a desirable embodiment the reactor (e.g. SCR) possesses the following two characteristics: (1) it facilitates contact of flue gas with the maximum possible quantity of catalyst in such a way that the flow resistance of the flue gas through the catalyst bed can be maintained within reasonable limits, preferably about or below 4 inches of water pressure drop; and (2) it has the ability to withdraw catalyst on a continuing basis so the catalyst can be reactivated outside of the bed, and then reintroduce the catalyst into that bed once reactivated. As will be appreciated, catalyst regeneration may be achieved in a variety of ways, for example to convert metal sulfates back to the corresponding oxides either thermally or chemically thereby removing the sulfur products from the catalyst.

Figure 2:
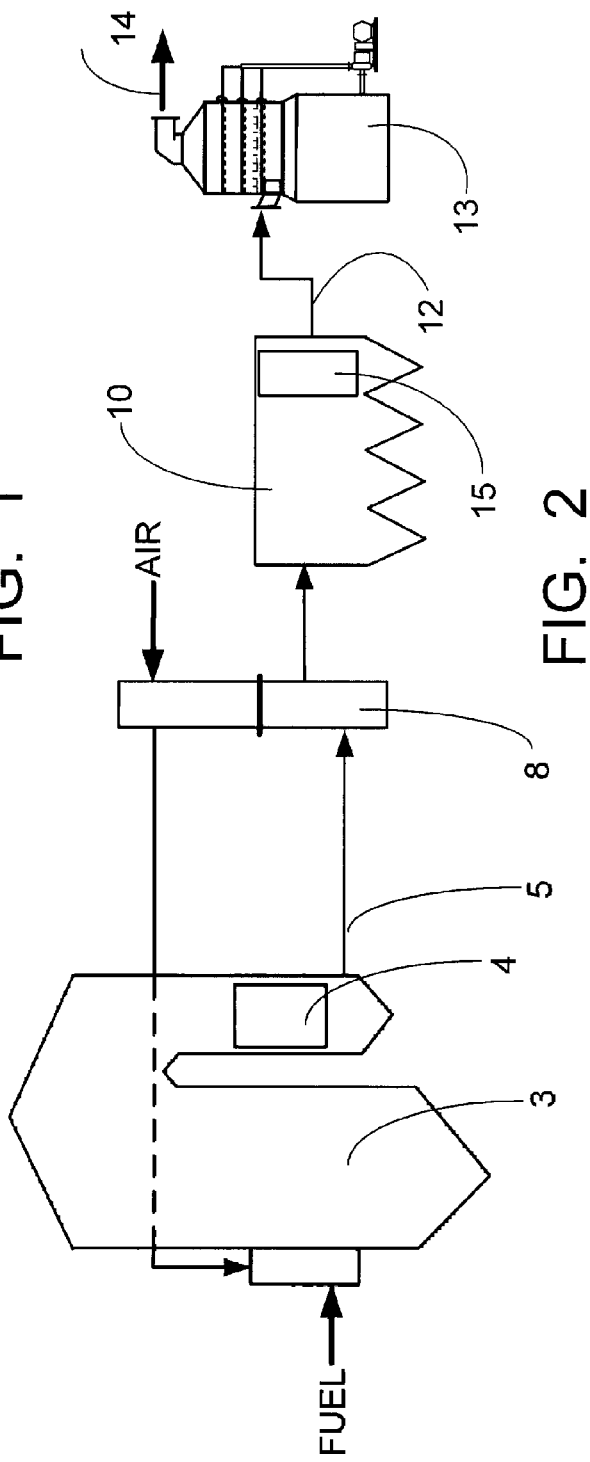
FIG. 2 is a schematic view of a boiler installation wherein a low-temperature SCR as disclosed herein is disposed within an electrostatic precipitator downstream of the air heater relative to the flue-gas pathway.
Figure 3:
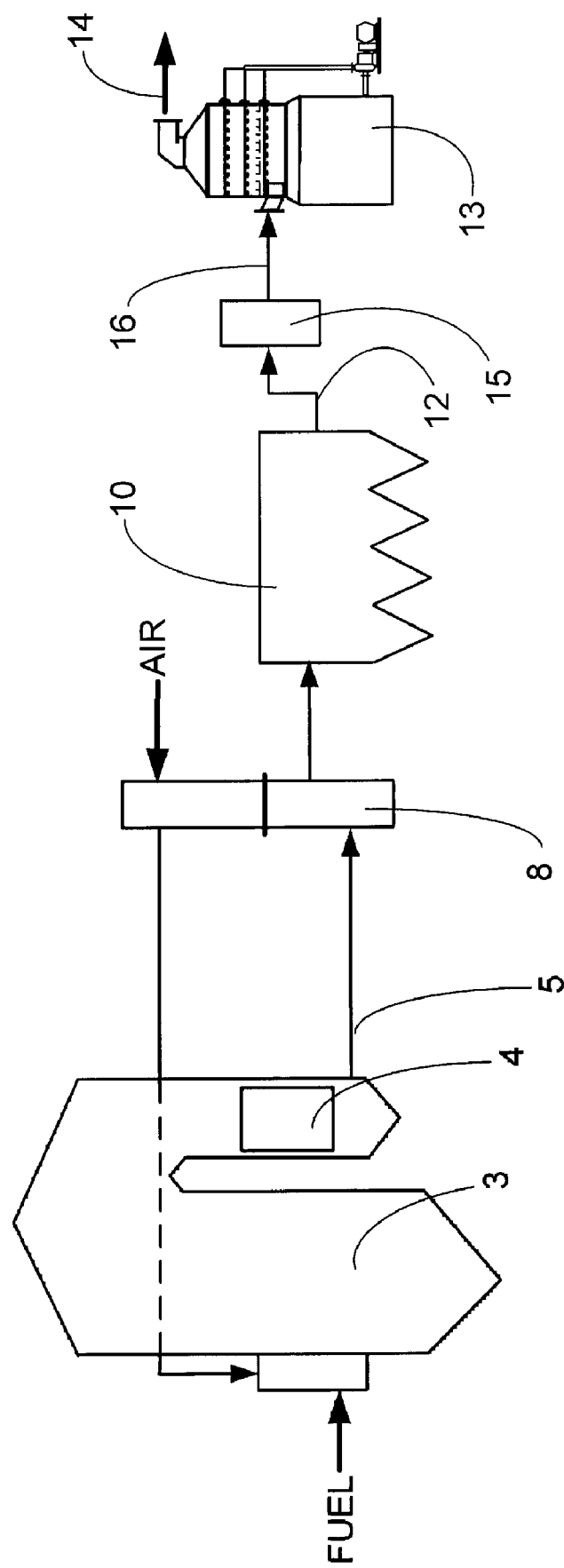
FIG. 3 is a schematic view of a further embodiment of a boiler installation wherein a low-temperature SCR as disclosed herein is located downstream of the electrostatic precipitator.

Since most applications of SCR technology are likely to be to existing coal-fired power plants for the next 10 to 20 years and since most of these plants utilize electrostatic precipitators (ESPs) for removing particulates entrained in the flue gas (e.g. fly ash), one desirable option is to utilize a portion of the existing ESP 10 to house a low-temperature SCR 15. This is illustrated in FIG. 2. If the power plant is equipped with a flue gas desulfurization (FGD) system 13 following the dust collector (ESP) 10, the SCR would replace the last field of the ESP. Any dust created by the SCR should be coarse enough to be captured by the FGD system. If the unit does not have an FGD system 13, then the SCR 15 could be placed in the next to last field of the ESP 10 so that the last field could be used to collect any dust generated in the SCR 15. FIG. 3 illustrates the use of a separate low temperature SCR 15; in the illustrated embodiment, the SCR 15 is located downstream of the ESP 10 and before the FGD 13. This may be appropriate for systems where the ESP particulate-removal performance is marginal.

Having disclosed certain advantages and locations where a low-temperature SCR 15 may be used, attention is now turned to specific embodiments therefor. In one exemplary embodiment, a moving bed reactor design is utilized for the SCR 15. In this embodiment, the SCR 15 includes one or a plurality of moving-bed reactors 30, wherein a moving bed of catalyst contacts the flue gas flowing therethrough, and is effective to promote the reduction of $NO_x$ (optionally and preferably through reaction with ammonia) and preferably oxidation of present Hg therein. As the catalyst moves through the reactor 30, gradually it may become degraded or inactivated through sulfur poisoning by contact and reaction with $SO_x$ that may also be present in the flue gas. Therefore, on exiting the SCR the catalyst material may undergo a reactivation treatment to regenerate the catalyst and reverse the effects of sulfur poisoning, prior to being reintroduced at the bed inlet for the SCR.

Figure 4:
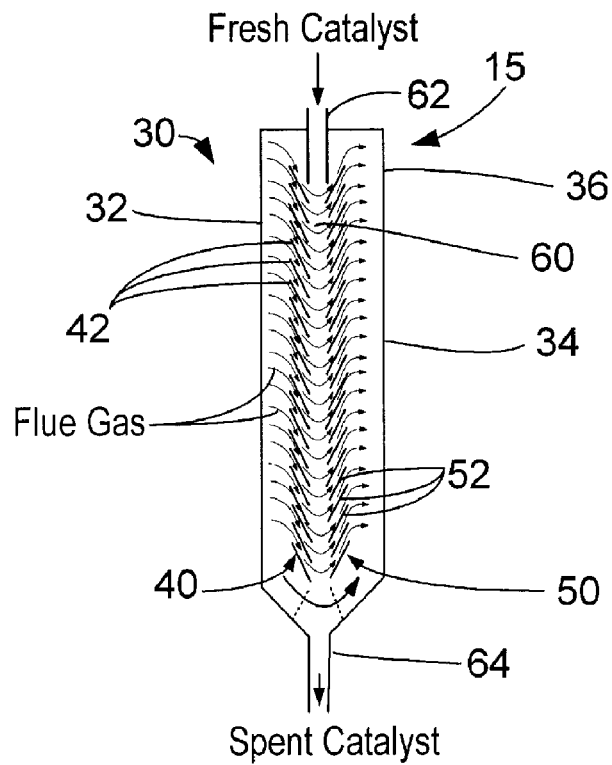
FIG. 4 is an end cross-sectional view of a moving-bed reactor for use in or as a SCR reactor as disclosed herein.

A reactor design of the type illustrated in FIG. 4 can be used for the moving-bed reactor(s) 30 of the SCR. FIG. 4 is an end view, in cross-section, of a moving-bed reactor 30. In the embodiment illustrated in FIG. 4, flue gas from the boiler enters the reactor 30 from the left, corresponding to the upstream side 32, travels through the first (upstream) and second (downstream) louver stacks 40 and 50, and then exits the reactor 30 from the right, corresponding to the downstream side 34 of the reactor 30. The first and second louver stacks 40 and 50 can be housed and retained within a reactor housing 36. The housing 36 preferably is open or substantially open at each of the upstream and downstream sides 32 and 34 to permit the flue gas to pass through. Alternatively, the upstream and downstream sides 32 and 34 can be or comprise perforated plates or plates with openings or slats to accommodate the flow of flue gas. As such, the terms boundary or boundaries may be employed in the following description to refer to the structures used to retain and convey the catalyst particles through the moving-bed reactor(s) 30, as described herein.

Figure 4A:
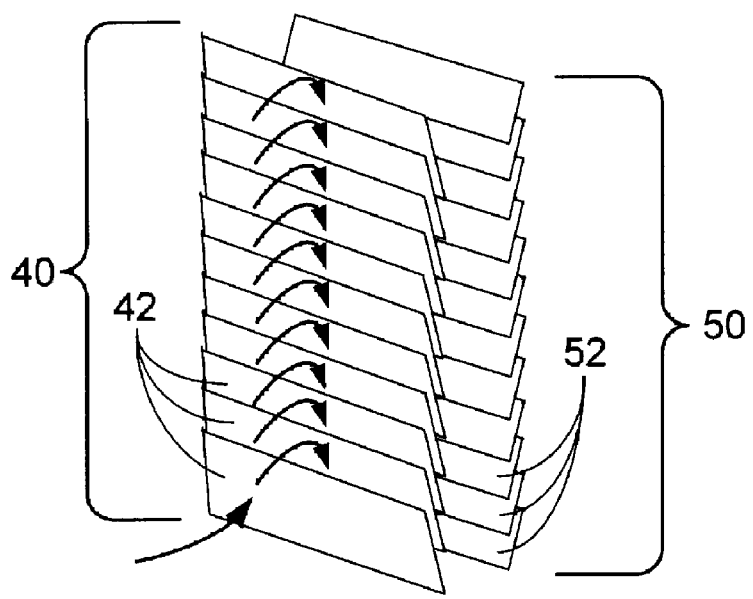
FIG. 4A is a perspective view of the first and second louver stacks in the moving-bed reactor of FIG. 4, with the housing removed.

Still referring to FIG. 4, the upstream louver stack 40 includes a plurality of vertically-spaced first louvers 42, which are angled at a decline from the upstream side 32 of the reactor toward the opposite or downstream side 34 thereof. Preferably, the first louvers 42 are parallel to one another. The downstream louver stack 50 similarly includes a plurality of vertically spaced second louvers 52, but which are angled at an incline from adjacent the upstream louver stack 40 toward the downstream side 34 of the SCR 30. In a preferred embodiment, the downstream louvers 52 are parallel to one another as well. FIG. 4A shows a perspective view of the upstream and downstream louver stacks 40 and 50, wherein the housing 36 has been removed. The vertical spacing of the respective first and second louvers 42 and 52 accommodates the flow of flue gas through the reactor 30, entering at the upstream side 32 and exiting at the downstream side 34 thereof. The louvers 42 and 52 are supported at their respective ends by attachment to lateral or end walls of the housing 36. Optionally, spacers (not shown) can be provided in between adjacent louvers to support them and maintain appropriate spacing along their expanse between the opposing end walls.

As will be appreciated from the above description and from FIG. 4, the moving-bed reactor 30 in this embodiment includes first and second opposed louver stacks 40 and 50, each having a respective series of vertically spaced and preferably parallel first or second louvers 42 and 52 extending between opposing ends of the reactor, wherein the first and second louvers 42 and 52 are inclined away from one another. The first and second louvers 42 and 52 are also spaced from one another in the direction of flue-gas flow so as to define a substantially vertical catalyst-bed pathway 60 between the louver stacks 40 and 50. The catalyst bed pathway 60 accommodates a moving bed of catalyst particles that can be fed from the bed inlet 62 located at the top of the reactor 30. Because the first and second louvers 42 and 52 are inclined away from one another, and away from the pathway 60 therebetween, catalyst particles 60 traveling vertically downward through that pathway will not readily exit laterally, toward either the upstream or downstream sides 32 or 34 of the reactor. Instead, catalyst particles in the bed pathway 60 will be guided downward toward the bed outlet 64 at the base of the housing 36. From there, the catalyst particles 60 can be conveyed to separate regeneration equipment, which can be located proximate or distant from the SCR. Although it is not required, the first and second louver stacks 40 and 50 may be mirror images of one another, meaning that the respective louvers 42 and 52 may be disposed at the same angle, although opposite in direction, from an imaginary central plane passing vertically in between the louver stacks 40 and 50. Alternatively, the louvers 42 and 52 may be at non-equivalent angles to said imaginary central plane. In a further alternative, there may be more or fewer louvers 42 than louvers 52, which may be spaced further apart or closer together than the louvers in the opposite stack.

Preferably, catalyst material is conveyed through the bed pathway 60 within the reactor, exits the outlet 64 via discharge equipment 66 (see FIG. 8) and is fed to other processing equipment or unit operations via an outlet conveyor to regenerate the catalyst. The regenerated particles are then preferably delivered back to the bed inlet 62 via an inlet conveyor to be recycled in a closed, continuous loop. The precise mechanism for conveying the catalyst particles, and the method to regenerate them, are not critical to the present embodiment and will be selected based on appropriate considerations, including available space for conveying equipment and appropriate chemistry to regenerate the catalyst particles from their spent state (on exiting the reactor 30). Herein, the 'outlet conveyor' and 'inlet conveyor' can be or include any suitable or conventional apparatus to convey catalyst particles between two points or stations. Such apparatus will be familiar to those having ordinary skill in the art. For example, it is contemplated that conveyor belts (not shown—preferably having side shields) can continuously convey spent catalyst particles from the outlet 64, to and through regeneration equipment where regenerating reactions are carried out, and then back to the inlet 62. It is to be appreciated that the outlet conveyor and inlet conveyor referred to above may not be discrete, but can comprise one continuous conveyor system from the outlet 64, through the regeneration equipment and then back to the inlet 62. In that case, the outlet conveyor refers to that portion thereof between the outlet 64 and the regeneration equipment, and the inlet conveyor refers to that portion thereof between the regeneration equipment and the inlet 62. Appropriate catalyst-regeneration chemistry in the case of sulfur poisoning of common base metal oxide salt catalysts, such as CuCl, is described elsewhere herein.

Figure 8:
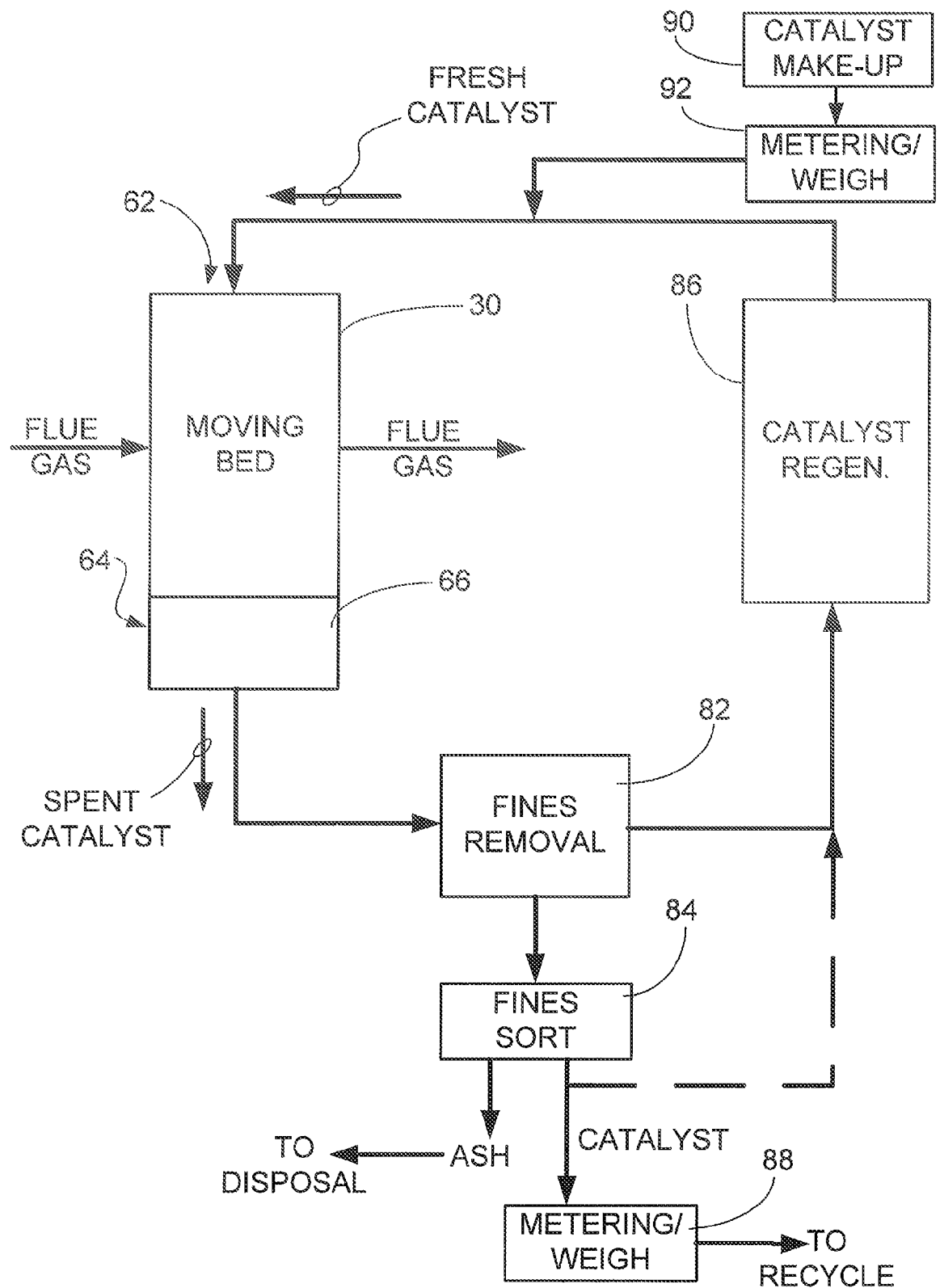
FIG. 8 is a schematic diagram showing the main components of a moving-bed reactor and catalyst-regeneration system according to the present invention.

In certain embodiments, it may be desirable to incorporate vibrating conveyors or elevators to transport the catalyst material between the moving bed and the regeneration equipment. When used, vibration may reduce or minimize particle attrition and consequent degradation of the particles as they traverse the conveying equipment. Vibrating conveyor- and elevator-equipment known in the art may be used for this purpose. Optionally, vibrating or non-vibrating conveyor equipment may be combined with heating elements or other apparatus to deliver thermal energy to the particles, thus contributing to the regeneration thereof while in transit to or from the regeneration equipment. Alternatively, pneumatic conveyors as known in the art may be used to convey catalyst particles between the regeneration equipment and the moving-bed reactor(s). In addition, hoppers (not illustrated) may be included to collect bed material from the bottom or base of the moving-bed reactors to deliver them to conveyor equipment, which conducts them to the regeneration equipment. Alternatively, the conveyors or other pellet-removal/conveying equipment may be flush mounted to the base of the reactor without hoppers (such as when using screw feeders) or could have hoppers of either a conventional design or a specialized transitional design to mate with other types of material-discharge flow rate control equipment (such as vibratory feeders, double-dump valves, lock-hoppers, rotary vane feeder/air-locks, etc.) as known in the art. The specific configuration will depend on the installation being retrofitted with the moving-bed reactor(s) described herein to provide an SCR, including such considerations as available space, unit operations already in place and their locations, etc. Selection of appropriate conveying equipment may also depend on specific bed material characteristics (pellets vs spheres vs other). In addition, the particular discharge equipment 66 used to remove the catalyst from the moving-bed reactors 30 must be selected to achieve a mass flow profile of the particles downwardly through the moving-bed(s) 30; that is, all the particles need to be in motion throughout the bed. It is undesirable to have, for example, a central core flow portion which flows through the bed 30 while other particles remain essentially stationary because the flue gas to be treated will not be uniformly exposed to catalyst particles of the same activity, nor will all the catalyst particles be uniformly removed from the bed(s) 30 for subsequent regeneration. The particle properties are measured (via shear tests, etc.) and used to arrive at an appropriate design of any hoppers and/or screw feeders, etc. which may form a part of the discharge equipment 66 to provide a mass flow profile of particles through the moving-bed(s) 30. A schematic flow diagram schematic diagram showing the main components of a moving-bed reactor and catalyst-regeneration system according to the present invention including an exemplary embodiment of the piping and instrumentation for regeneration equipment that can be used in conjunction with one or more moving-bed reactors as disclosed herein is illustrated in FIG. 8. As seen in FIG. 8, the regeneration equipment may include a cyclonic receiver 82 to separate dust and particulate fines from usable catalyst particles that may be regenerated. The regenerable catalyst particles may optionally be delivered from the cyclonic receiver 82 to a secondary fines sorting device 84 to provide secondary fines removal. The fines from both the cyclonic receiver 82 and the sorting device 84 may be combined and conveyed to the catalyst regeneration equipment 86. Ash particles separated in sorting device 84 may be sent to disposal, while catalyst particles suitable for recycle may be sent via metering/weigh device 88 to recycle facilities for reuse in the manufacture of new catalyst pellets. In this embodiment, a scale may be used to determine the precise quantity of catalyst particles that are removed from the closed-loop system. This may be useful, for example, should it be desirable to introduce a certain percentage of fresh catalyst to the closed-loop system periodically, to ensure that the amount of fresh catalyst added corresponds to the amount being removed. Following regeneration in the catalyst regeneration equipment 86, fresh catalyst is conveyed back to the bed inlet(s) of the moving-bed reactors 30 as shown, along with fresh make-up catalyst from catalyst make-up source 90 via a suitable metering/weigh device 92. As noted above, the catalyst-particle conveying equipment between any device may be belt-drive, pneumatic, bucket elevators, screw conveyors, or a combination of same as required with or without other conveying mechanisms as known in the art.

As will be appreciated, the reactor 30 is thus configured so that flue gas from the boiler approaches the upstream side 32. The gas then enters the reactor and travels between the vertically-spaced first louvers 42, through the bed pathway 60, and then exits between the vertically-spaced second louvers 52 and out the downstream side 34. (See arrows in FIGS. 4 and 4A). During operation, the bed pathway 60 is packed with catalyst particles so that $NO_x$ and optionally mercury present in the flue gas will undergo catalytic reduction or oxidation, respectively, on contact with the catalyst in the presence of other necessary or desirable reactants, if any. For example, ammonia can also be delivered into the reactor via conventional means (e.g. spray or aerosol mist delivered to the flue gas prior to entering the SCR) to act as a reductant for $NO_x$ in the presence of the catalyst bed.

Figure 4H:
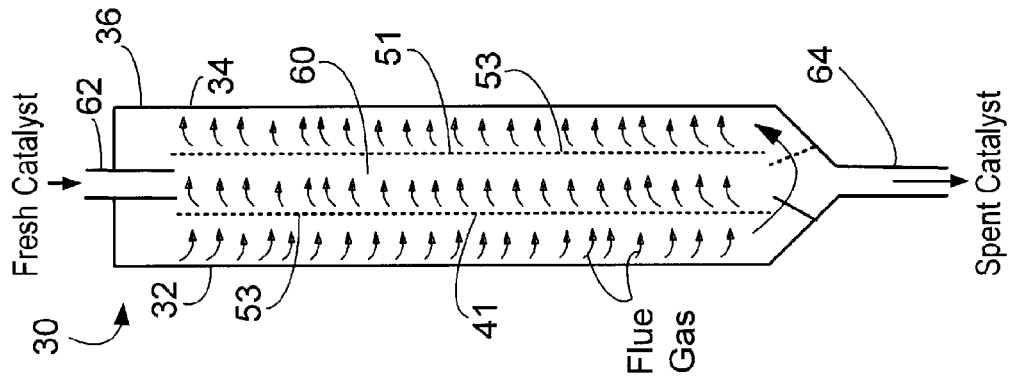
FIG. 4H is an end cross-sectional view of an alternative embodiment of the moving-bed reactor for use in or as a SCR reactor as disclosed herein, wherein perforated plate is substituted for the louver arrangement at the upstream and downstream sides.
Figure 4G:
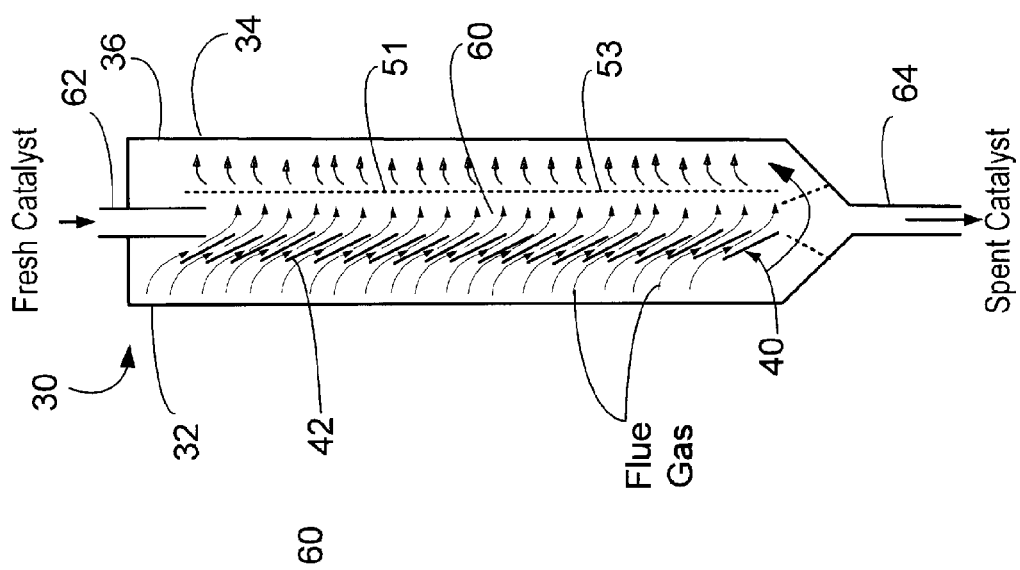
FIG. 4G is an end cross-sectional view of the alternative embodiment of the moving-bed reactor of FIG. 4B.
Figure 4F:
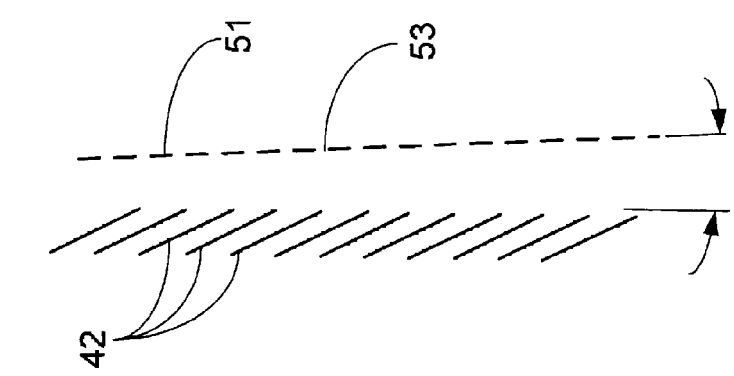

FIGS. 4B through 4H illustrate alternative embodiments of the moving bed reactor 30 where perforated plate is substituted for the louver arrangement at either or both of the inlet or upstream side 32 and the outlet or downstream side 34. FIGS. 4B through 4G illustrate substitution of a perforated plate 51 having a plurality of apertures 53 for the downstream side louvers 52. Advantageously, the apertures 53 are small enough to retain the catalyst particles within the catalyst bed pathway 60 and the porosity of the perforated plate 51 as determined by the number and spacing of the apertures 53 is large enough to minimize pressure drop as flue gas exits the moving bed SCR 30. On the outlet side, a perforated plate with ~25% open area and hole diameters ~½ the diameter of the catalyst bed material or pellets may thus be employed in lieu of the louver arrangement. In an exemplary embodiment, the catalyst particles are cylindrical and have a mean particle diameter of about 3 mm, and an L/D ratio of about 1 up to about 4. In any event, the apertures 53 in the plate 51 have a diameter so that the area of each aperture is approximately 25% of the mean particle diameter of the catalyst particles. In order to enhance solids flow down through the moving bed pathway 60, the inlet louvers 42 may be slightly sloped from vertical, as shown in FIG. 4D. Alternatively, the downstream perforated plate 51 may be slightly sloped from vertical, as shown in FIG. 4E, or both the inlet louvers 42 and the downstream perforated plate 51 may be slightly sloped from vertical, as shown in FIG. 4F. In the preceding sentence, "slightly sloped from vertical" means that the array of louvers 42 or plate 51 is/are angled slightly away from the center of the catalyst bed pathway 60 in a downward direction corresponding to the direction of flow of catalyst particles through the bed pathway 60. It is believed this will assist in the flow of catalyst particles through the pathway 60 and reduce the tendency for particle entrainment therein. See, for example, U.S. Pat. Nos. 5,167,931 and 5,266,288. FIG. 4G shows an inlet louver/outlet perforated plate arrangement as provided in housing 36.

The inlet louvers 42 are preferred to reduce the possibility of pluggage by fly ash particles conveyed by the flue gas entering the moving bed 30. However, if the likelihood of pluggage is slight, and/or if particulate collection devices are employed upstream of the moving bed 30, it is possible to employ both an upstream perforated plate 41 and a downstream perforated plate 51, the catalyst particles being conveyed down through the catalyst bed pathway 60. This embodiment is shown in FIG. 4H. Similarly as mentioned above, the perforated plate 41 can also be sloped from vertical to facilitate the passage of catalyst particles through the bed pathway 60.

As will be appreciated, the moving-bed reactor 30 described above will have a substantial lateral expanse between opposite ends thereof, with the louvers 42 and 52 (or perforated plates 41, 51, or a combination of louvers 42 and plate 51) described above preferably extending between those ends. Consequently, it will be further appreciated that during operation the catalyst particles disposed in and moving through the bed pathway 60 will form a substantially planar, vertically-extending particle bed moving generally downward through the reactor 30 in between the opposing louver stacks 40 and 50, or perforated plates 41, 51, or combination of louvers 42 and plate 51. The catalyst bed will have a thickness in the gas-flow direction that approximates the distance in the same direction between adjacent edges of the respective first and second louvers 42 and 52, or between the perforated plates 41, 51, or between louvers 42 and plate 51, depending on the particular embodiment. Preferably, the linear speed of the bed particles downward through the moving bed reactor 30 is relatively slow, such that it approximates a fixed bed as will be explained in more detail below.

Figures 5, 5A:
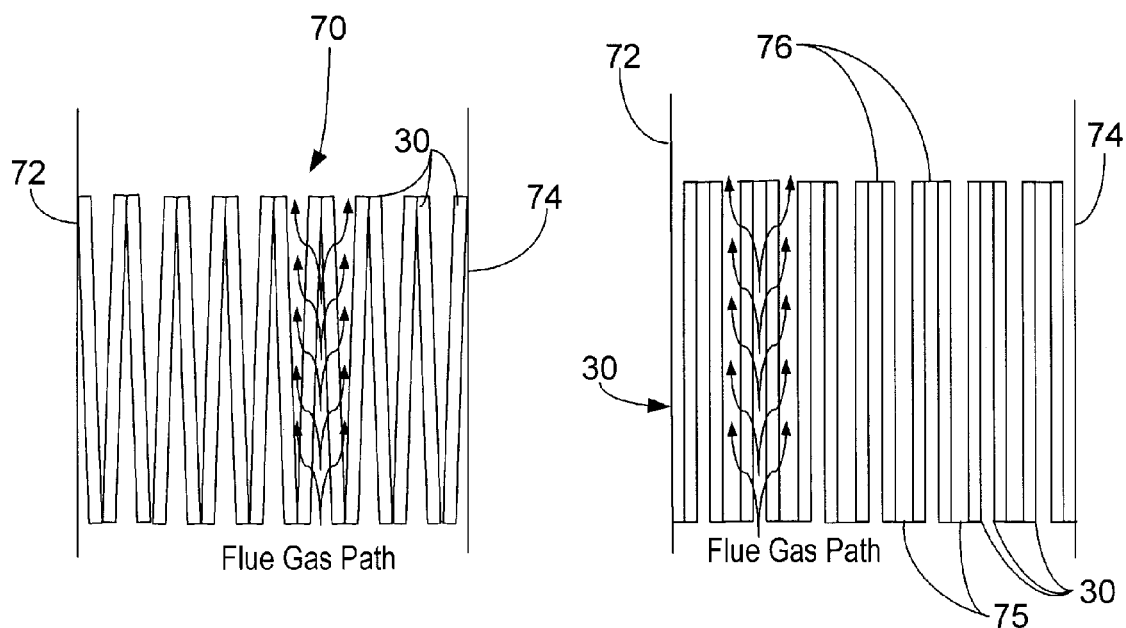
FIG. 5 is a plan view of a SCR reactor that includes a plurality of moving-bed reactors as disclosed herein, arranged in an accordion configuration and in parallel relative to the flue-gas pathway through the SCR.
FIG. 5A is a plan view of a SCR reactor that includes a plurality of moving-bed reactors as disclosed herein, arranged in an orthogonal configuration and in parallel relative to the flue-gas pathway through the SCR.

Referring now to FIGS. 5 and 5A, an SCR can be equipped with a plurality of moving-bed reactors 30 as described above, arranged in an array to provide desirable $NO_x$ reduction (and Hg oxidation). Preferably, the SCR includes a plurality of the reactors 30 arranged in parallel relative to the flue-gas flow direction through the SCR. Two such arrangements are illustrated in FIGS. 5 and 5A, respectively. Specifically, FIG. 5A shows a plan view of one possible arrangement, wherein several moving-bed reactors 30 are arranged in an accordion configuration in between opposing end walls 72 and 74 of the SCR 70. As indicated by the arrows in FIG. 5, flue gas approaches the SCR in the superficial flow direction through the SCR 70 (vertically in FIG. 5), and follows a lateral path (relative to the superficial flow direction) through the moving-bed reactors 30 before exiting the SCR 70. By 'superficial flow direction,' what is meant is the general or overall direction of flue gas flow through the SCR along a flue-gas pathway, between the entrance and exit of the SCR along that pathway. In the illustrated accordion configuration, the proximal end of each reactor 30 is in contact with the proximal end of one adjacent reactor 30 but not the other (or the wall 72, 74 as the case may be). Flue gas is thereby permitted to enter via spaces in between non-contacting adjacent reactors 30 and to be redirected laterally through the reactors 30 before exiting via alternate openings between adjacent reactors on the downstream side of the SCR 70. FIG. 5A illustrates an alternative embodiment wherein the reactors 30 in the SCR are arranged in an orthogonal configuration, all parallel to one another and extending in the superficial flow direction of the SCR 70 between the walls 72 and 74. In this embodiment, flue gas is prevented from entering the openings between every other pair of adjacent reactors 30 by a series of panels 75 closing off those openings. A second series of panels 76 is used to close off the alternate openings at the downstream end of the SCR 70.

A moving bed is an excellent particulate collection device in its own right and would in general have the particulate collection ability of the fourth or last field of a conventional ESP because mostly what is collected in the last field of an ESP is the rapping entrainment from the preceding fields. However, if an ESP is barely making performance with all four fields in full use, then sacrificing a single field for use as an SCR may be too risky. Under those conditions, the arrangement depicted in FIG. 3 above would be preferred.

Figure 6:
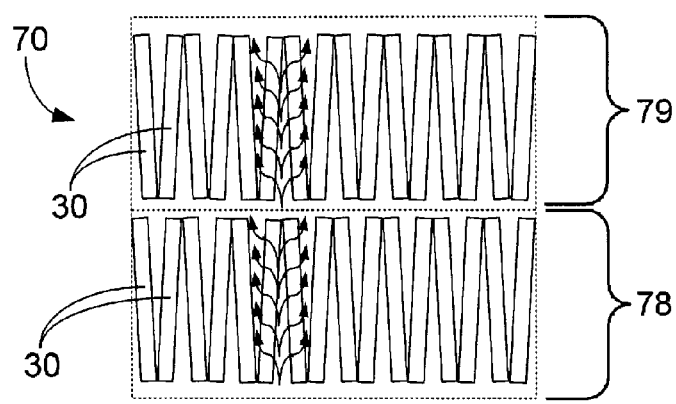
FIG. 6 is a plan view illustrating first and second banks of moving-bed reactors as disclosed herein, wherein the second bank is arranged downstream in series relative to the first bank, and wherein each bank includes a plurality of moving-bed reactors arranged in parallel and in accordion configuration.

In general, mixtures of catalysts, one optimized for SCR $NO_x$ reduction or direct $NO_x$ destruction and the other catalyst/reactant optimized for mercury oxidation, will be utilized together in the same moving beds. In this configuration both catalysts would undergo the same regeneration steps to be described later. An alternative configuration where two moving-bed reactors or banks of moving-bed reactors 78 and 79 are placed in series in an SCR 70 is illustrated in FIG. 6. In this embodiment, each bank of moving-bed reactors 30 could utilize a separate hopper, particle-conveyor and regeneration system, so that the different circulating catalyst/reactants in each of the respective banks 78 and 79 can be treated according to separate regeneration steps utilizing distinct reactions. This embodiment may be employed, for example, where it is desired to employ separate catalysts and separate catalyst-regeneration systems for $NO_x$ reduction, which can be carried out by the catalyst in the first bank 78, and mercury oxidation, which can be carried out by the catalyst in the second bank 79.

The pressure drop across conventional SCRs is on the order of 4 inches water gauge (~1 kPa). Every inch of pressure drop in the power train is generally estimated to equate to a loss of about 0.05% of power-plant cycle efficiency. As a consequence, conventional SCRs typically degrade the power-generation cycle efficiency by around 0.2%. Power-plant operators and electric-generating utilities consider this loss to be significant. Therefore, it is desirable to consider a pressure drop of 4 inches water gauge to be an upper permissible limit in the design of a new SCR, including the novel construction disclosed herein comprising one or more moving-bed reactors 30. The challenge therefore is to significantly increase the product $a_p \tau$ in Eq. 1 above without significantly increasing pressure drop.

The requirements of low pressure drop, high $a_p \tau$ and continuous regeneration and recycle of catalyst are all met using a moving catalyst bed in the moving-bed reactors 30 shown in FIGS. 4 and 5 and described above. A moving bed as illustrated here comprises a substantially vertical plane of granular solids and has a thickness approximately defined by the distance between the opposing louvers 42 and 52 as explained previously. The particle bed can move downward by gravity at a relatively slow rate, preferably less than one foot per minute, preferably much less than one foot per minute, for example not more than 8 inches per minute, 6 inches per minute, 4 inches per minute or 2 inches per minute. The bed is supported by a multiplicity of angled louvers at the center of each reactor 30, namely the first and second louvers 42 and 52 described above. From a fluid-dynamics standpoint the flue gases pass through the moving bed as if it were a fixed bed when the bed travels at sufficiently low linear speeds, such as those described herein. Therefore, the following set of equations describing the pressure drop through fixed beds can be used to describe the pressure drop through slowly moving beds:

$$N_{Eu} = \left(\frac{1000}{7.5 N_{Re}} + 2.33\right)\frac{L}{D_{eq}}$$

$$N_{Eu} = \frac{\Delta P}{\rho_f v_m^2 / 2 g_c}$$

$$v_s = v_m \varepsilon$$

$$D_{eq} = \frac{2}{3}\left(\frac{\varepsilon}{1-\varepsilon}\right)\frac{\overline{D}_{32}}{\phi}$$

$$N_{Re} = \frac{\rho_f v_m D_{eq}}{\mu_f}$$

$N_{Eu}$=Euler's Number  $v_m$=Mean fluid velocity
$N_{Re}$=Reynolds Number  $v_s$=Superficial velocity
$D_{eq}$=Equivalent diameter  $\varepsilon$=Void fraction
$\overline{D}_{32}$=Sauter mean diameter  $\mu_f$=Fluid viscosity
$\phi$=Shape factor  $\rho_f$=Fluid density The variables in these equations that can be readily controlled are the path length, L, the catalyst size as expressed by $\overline{D}_{32}$, and the superficial velocity. The fluid properties and void fraction of the catalyst are not variables that can be easily manipulated. The specific surface is related to the $\overline{D}_{32}$ by the following relationship:

$$S_p = \frac{6}{\phi \rho_p \overline{D}_{32}}$$

Where $\rho_p$=the particle density

The residence time is simply $\tau = L/v_m$. It is clear that in order to maximize $a_p \tau$, in Eq. 1 above the moving-bed reactors 30 should be designed to maximize the thickness (depth in the gas-flow direction) of the moving bed within prevailing space constraints, and to minimize velocity of the gas through the bed as well as the Sauter mean diameter consistent with the desired maximum pressure drop of four inches of water.

The embodiment in FIG. 5, previously described, provides an arrangement of moving-bed reactors 30 for an SCR that maximizes flue gas flow area and therefore minimizes the gas velocity through the beds. As shown in FIG. 5, the reactors 30 can be arranged in accordion style. In an exemplary embodiment, the reactors 30 can be dimensioned to fit and be arranged in accordion configuration in the last field of an electrostatic precipitator sized to treat flue gas from a 100 MW boiler burning bituminous coal. Typical envelope (exterior) dimensions for a moving-bed reactor 30 in this embodiment may be, for example, 34 feet wide by 39 feet high, by 20 feet deep (in the direction of flow). The louvers 42 and 52 can correspondingly be dimensioned to provide a spacing of 10 inches between the adjacent edges thereof, providing a nominal bed thickness (in the direction of gas flow) of ten inches, with further dimensions of 39 feet high by approximately 20 feet wide.

Figure 7:
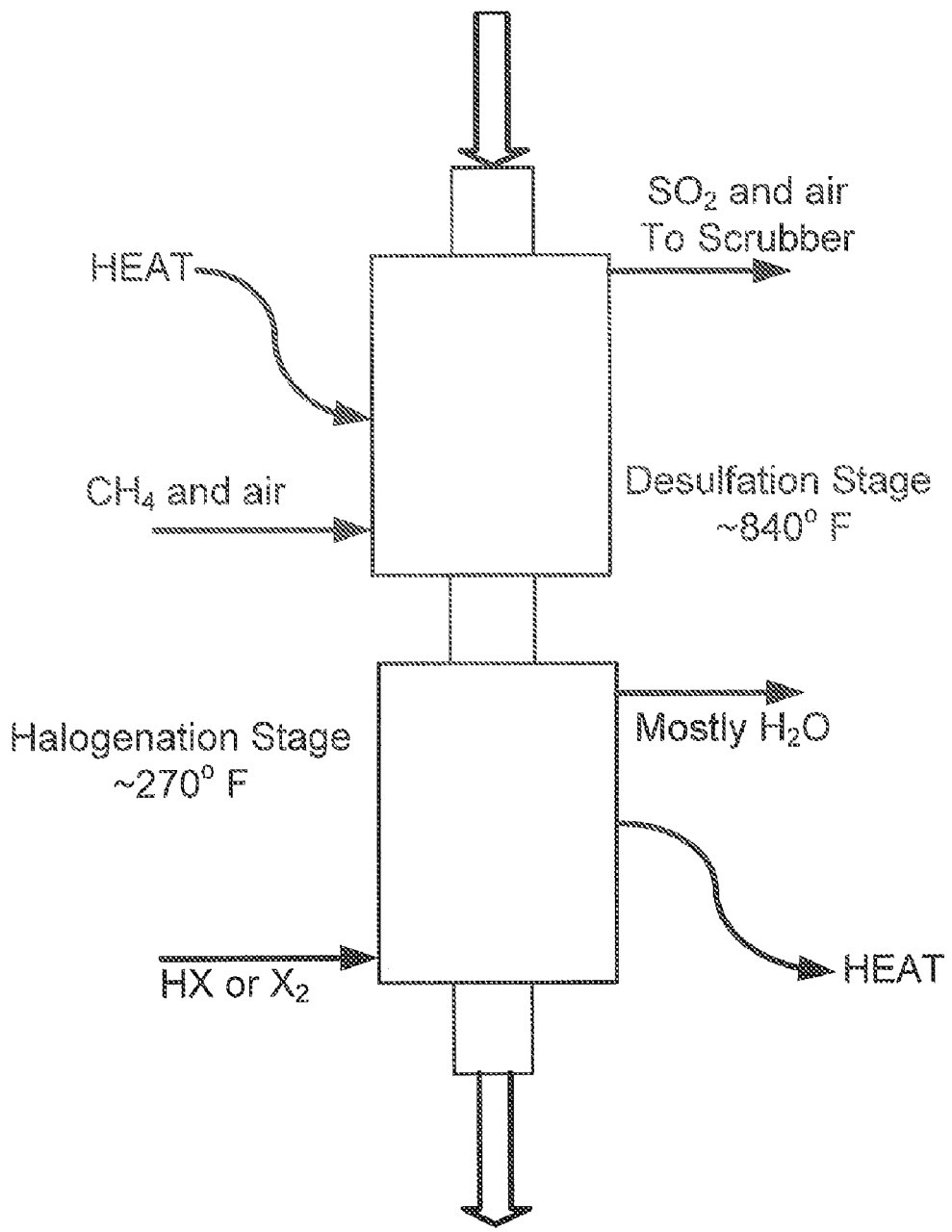
FIG. 7 is a schematic diagram of one embodiment of catalyst-regeneration equipment.

As indicated above, when a common base-metal catalyst such as a common base metal halide or oxide that is susceptible to sulfur poisoning is used, for example to enable adequate $NO_x$ reduction at low temperatures such as below 350° F., a regeneration system may be used to return the poisoned catalyst back to its fresh state. FIG. 7 shows an embodiment of a regeneration system that can be used in conjunction with the moving-bed reactors described above, preferably in a closed-loop catalyst-circulating system. Catalyst drawn from the bed outlet 64 of a reactor 30 can be fed to the regenerator reactor 80, which can operate in a moving- or fluidized-bed configuration. Catalyst poisoning would principally be due to sulfation reactions from $SO_x$ in the flue gas, e.g.: $CuO+SO_2+\frac{1}{2}O_2 \Rightarrow CuSO_4$. This sulfur poisoning reaction proceeds at a measurable rate at about 750° F. The moving-bed reactors 30 disclosed herein preferably will operate at about 300° F.; that is, preferably downstream from the air heater in the flue-gas flow direction. As such, the rate and extent of sulfur poisoning will be small, meaning the regenerator reactor 80 can be sized for a relatively small duty of desulfation. In a preferred embodiment, injection of natural gas (methane, $CH_4$) at elevated temperature, e.g. about 840° F., for the regeneration of the sulfated catalyst will be employed. This reaction proceeds according to: $CuSO_4+\frac{1}{2}CH_4 \Rightarrow Cu+SO_2+\frac{1}{2}CO_2+H_2O$. Cu is subsequently oxidized in the presence of $O_2$ and returned to their active "SCR-of-NOx" state. The exhaust of the sulfate regeneration system mainly consists of air and small amounts of $SO_2$ and $CO_2$. As shown in FIG. 7, this stream can be delivered into the wet scrubber that typically will be located downstream of the moving-bed reactor 30 or SCR 70 for cleanup.

In the moving-bed catalytic reactor 30, a fraction of the $Hg^0$ oxidation catalyst ($CuCl/CuCl_2$ or $CuBr/CuBr_2$) will be irreversibly converted to CuO according to $Hg^0 + CuX_2 + \frac{1}{2}O_2 \Rightarrow HgX_2 + CuO$, where X denotes Cl or Br. Following the desulfurization/regeneration of the catalyst by natural gas, halogens ($X_2$) or hydrogen halides (HX) will be contacted with the $Hg^0$ oxidation catalyst to regenerate its active species (see FIG. 7). The regeneration of $Hg^0$ oxidation catalyst initiates in the temperature range of 230-300° F. It should be noted that for the combustion of high chlorine bituminous coals, the halogenation step may not be required. In this case the $Hg^0$ oxidation catalysts may be continuously halogenated in-situ by hydrogen chloride in the flue gas. Regeneration of the catalyst may also involve the use of wash materials such as gases, vapors, fluids, solids or a combination thereof to return the catalyst to restore catalyst activity. In addition, although not shown in the Figures, it may be desirable to provide for gas preheating upstream of the moving-bed reactor(s) 30 if a specific temperature window entering same is required. Alternatively, such gas preheating may permit relocation of the moving-bed reactor(s) 30 to a position downstream of the flue gas desulfurization equipment 13. At this location, the flue gas 14 has been cleansed of flyash and most sulfur oxide and other contaminants species, but is too cool for proper catalytic activity of low temperature catalyst; gas preheating to a desired temperature would then be required.

The moving-bed reactor 30 disclosed herein presents numerous advantages when incorporated into an SCR 70 for $NO_x$ reduction. These advantages include the capability for simultaneous low-temperature $NO_x$ reduction and mercury oxidation, the use of less costly catalyst, easier retrofitting than conventional SCRs, the capability to place the reactor(s) 30 in an existing ESP casing, lower impact on power plant cycle efficiency, low impact of fly ash, elimination of ammonium bisulfate fouling of air heater surfaces, and low impact of load swings on performance.

Specifically, conventional sulfation-resistant metal SCR catalysts cost on the order of $10,000 per megawatt of power plant capacity. Copper oxide catalysts sufficient to achieve the necessary $a_p\tau$ at equivalent performance to conventional SCR catalysts, but at the air heater exit temperatures (e.g. 250-350° F.), cost about $2,000 per megawatt. Iron oxide catalyst is somewhat less costly, yet. The use of conventional monolith catalyst configuration for SCR at the air heater exit temperature would require noble metal catalysts such as platinum at a cost in excess of $50,000/MW.

Mixing catalysts to meet the dual objectives of $NO_x$ reduction and mercury oxidation is straight forward in the moving bed. This provides the ability to tailor the catalysts to the specific requirements for $NO_x$ reduction and mercury oxidation, depending upon the specific needs of the power plant.

Of the $50,000 to $60,000 per megawatt to retrofit an SCR into an existing power plant, about one third of that cost results from the difficulties of fitting the SCR into the limited space available between the boiler economizer and air heater. Because of the way power plants have been generally designed and built, the location of the SCR installation is generally in excess of 100 feet above grade. This construction causes the boiler to be taken out of service for an extended period of time to facilitate the construction of the SCR. During this period, the power plant operator cannot generate power, and consequently loses sales revenues during this construction period. By contrast, an SCR capable to effectively reduce $NO_x$ (and oxidize elemental Hg) at low temperatures prevalent in the flue gas after exiting the air heater can be constructed at grade level and simply cut into the power train between the dust collector (ESP) and stack (or FGD system) during a relatively short power outage. This obviates problems associated with space constraints upstream of the air heater, between it and the economizer in conventional installations. If an evacuated field of the ESP is to be used to house the moving-bed reactors 30 described herein, and thereby to essentially be converted into a low temperature SCR, then the top of the ESP field to be used can be removed, the electrical internals (electrodes and collection plates) hoisted out of the ESP, and the new reactors 30 lifted and set into place with all work being performed at grade level. If the boiler has multiple flue gas trains at the backend including multiple ESPs, then each ESP can be fitted one at a time permitting the unit to continue power generation at reduced load while construction continues.

Conventional SCRs impact the power plant efficiency negatively in at least two ways. The first has to do with pressure drop as noted earlier. The moving-bed reactors 30 disclosed here may not offer any improvement here, principally because pressure drop has a beneficial effect on $NO_x$-reduction performance by forcing uniform flue gas flow across the moving beds. The other large energy penalty of conventional SCR retrofits is the bypass of flue gas around the economizer to provide means of temperature control at the SCR inlet, especially as load varies or catalyst ages. A portion of the thermal energy in this stream is lost to the steam cycle. Some (but not all) of that lost energy will be recovered by the air heater. For example, a 100° F. rise in the flue gas temperature at the SCR inlet will result in about a 50° F. rise in the flue gas temperature leaving the air heater. That example would cause a loss of boiler efficiency of around 0.5%.

Ammonia can be injected upstream of the SCR reactor to provide the reductant for reaction with NO and $NO_2$ as noted above. Unwanted side reactions that occur at the elevated operating temperatures of conventional SCRs include reactions among ammonia, water vapor and sulfur trioxide to form ammonium sulfate and ammonium bisulfate aerosols. The former forms a solid aerosol that is inconsequential to the operation of the power plant. But, the latter, ammonium bisulfate ($NH_4HSO_4$) has a melting point of 297 F. Since it is the salt of a strong acid and weak base, this aerosol is both acidic and liquid. It tends to deposit on air heater surfaces where it gathers fly ash and creates operating problems and longer term corrosion problems. By contrast, most surfaces downstream of the air heater (flue gas flow direction), including a low-temperature SCR installed downstream, are near or below the melting point of the ammonium bisulfate. Surface fouling by ammonium bisulfate is thus not a significant problem for the low temperature SCR herein disclosed. For the moving-bed reactors 30, even if ammonium sulfate or bisulfate were to deposit on the catalyst surface, the periodic, continuous regeneration of the catalyst with natural gas as disclosed above offers a mechanism to remove or decompose this deposit on a continuous basis according to the following reactions:

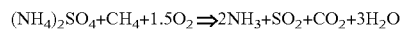

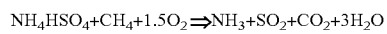

Incorporating a series or bank of moving-bed reactors 30 in an existing ESP downstream of the air heater as described above would be the least costly means to implement a moving-bed SCR in a retrofit environment. However, it will be understood that a stand-alone moving-bed reactor 30 or bank of reactors could be disposed in-line with the flue gas stream to provide an SCR according to the disclosed embodiments at any point downstream of the air heater or ESP.

It will be appreciated from the foregoing that by implementing one or a plurality of moving-bed reactors to contact flue gas with a moving catalyst bed in an SCR, more plentiful and less costly common base metal catalysts can be used for $NO_x$ and Hg abatement, despite their susceptibility to sulfur poisoning by $SO_x$ compounds that may also be present in the flue gas. This is because fresh catalyst can be continuously introduced into the catalyst bed. Spent catalyst, e.g. catalyst particles that have been degraded through sulfur poisoning, are also continuously removed from the catalyst bed, and can be either discarded or regenerated and re-introduced into that bed (the latter being preferred). Also, because many of these common base-metal catalysts result in lower activation energies for the reduction of $NO_x$ than their sulfation-resistant metal oxide counterparts, an SCR utilizing these common base-metal catalysts in a moving-bed reactor can be disposed downstream of the air heater because the flue gas need not be as hot to facilitate $NO_x$ reduction. This results in improvement in the efficiency of electric-generating boiler installations because the SCR no longer needs to be located upstream of the air heater, which results in a loss of thermal energy that otherwise could be used to preheat the incoming combustion air. In addition, the need for a bypass line around the economizer to ensure adequate flue-gas temperature for sulfation-resistant metal catalysis in the reduction of $NO_x$ is completely eliminated. This removes another source of lost efficiency in the traditional SCR-retrofit designs. It is preferred that the catalyst particles used in the moving-bed reactors disclosed herein are substantially devoid of costly sulfation-resistant metals, meaning that these sulfation-resistant metals, if present, are present only as unavoidable impurities or otherwise in small amounts normally present in conventional sources of the preferred common base metal or metal-oxide catalyst compounds, such as CuCl or $CuCl_2$. Using common base-metal catalysts in the moving-bed reactors disclosed herein, preferably at least 40%, more preferably at least, 50, 60, 70, 80, 90 or 95, percent of all $NO_x$ present in the flue gas is reduced on contacting the catalyst particles in the moving bed (e.g. through catalyzed reaction with ammonia reductant, also present), at a temperature in the range of 250-350° F. In preferred embodiments, at least 40%, more preferably at least, 50, 60, 70, 80, 90 or 95, percent of all elemental mercury present in the flue gas is also oxidized to an elevated oxidation state on contacting the catalyst particles, which may contain separate catalyst species effective for $NO_x$-reduction and Hg-oxidation, respectively. As mentioned above, such separate catalyst species may be blended to form a composite catalyst blend, or the SCR may include two separate banks of moving-bed reactors arranged in series, one with $NO_x$-reduction catalyst and the other with Hg-oxidation catalyst.

While the invention has been disclosed with respect to certain embodiments, it is to be recognized that the invention is not limited thereby, and numerous modifications and adaptations thereto, as well as other embodiments, are possible and could be made by a person of ordinary skill in the art who has reviewed the present disclosure. For example, though the foregoing description is provided primarily with respect to coal-burning boilers, it will be appreciated that the moving-bed SCR technology described herein can be applied to control or abate $NO_x$ and other emissions (such as Hg) in the flue gas exiting any other type of boiler or combustion chamber, including those burning other fuels, such as wood waste, bio-mass, municipal waste, and trash, wherein such undesirable species are generated. As a further example, common base metal oxide or salt compounds other than those based on copper may also be used in the moving-bed reactors disclosed above. All of the foregoing are to be considered within the spirit and the scope of the present invention as set forth in the appended claims.

What is claimed is:

1. An apparatus comprising:
   a combustion chamber for combustion of a fuel, which during operation generates a flue gas that may contain a quantity of NO that it is desired to remove; and
   a SCR reactor for reducing at least a portion of NO present in the flue gas, said SCR reactor comprising a moving-bed reactor that comprises first and second opposed boundaries spaced apart from one another to thereby define a substantially vertical catalyst-bed pathway therebetween, said first and second opposed boundaries comprising, respectively, a first louver stack and a second louver stack, each said louver stack comprising a series of vertically-spaced first or second louvers, respectively, said first and second louvers in the respective first and second louver stacks being inclined away from one another, said catalyst-bed pathway being defined between said first and second louver stacks,
   wherein flue gas traveling through said moving-bed reactor follows a path between the vertically-spaced first louvers, through the bed pathway, and then exiting between the vertically-spaced second louvers.

2. The apparatus of claim 1, said first and second opposed boundaries comprising, respectively, a first louver stack disposed adjacent an inlet of said reactor and a perforated plate disposed adjacent an outlet of said reactor, said first louver stack comprising a series of vertically-spaced first louvers that are inclined away from said perforated plate, said catalyst-bed pathway being defined between said first louver stack and said perforated plate,
   wherein flue gas traveling through said moving-bed reactor follows a path between the vertically-spaced first louvers, through the bed pathway, and then exiting through apertures provided in said perforated plate.

3. The apparatus of claim 1, said first and second opposed boundaries comprising, respectively, first and second perforated plates, said catalyst-bed pathway being defined between said first and second perforated plates,
   wherein flue gas traveling through said moving-bed reactor follows a path through a first set of apertures provided in said first perforated plate, through the bed pathway, and then exiting through a second set of apertures provided in said second perforated plate.

4. The apparatus of claim 1, said SCR reactor comprising a plurality of said moving-bed reactors arranged in parallel relative to a pathway for flue gas through the SCR reactor.

5. The apparatus of claim 4, said plurality of moving-bed reactors being arranged in an accordion configuration when viewed from above.

6. The apparatus of claim 1, said SCR reactor comprising:
   a first bank of said moving-bed reactors arranged in parallel relative to a pathway for flue gas through the SCR reactor; and
   a second bank of said moving-bed reactors arranged in parallel relative to said flue-gas pathway;
   said second bank being arranged in series with and disposed downstream of said first bank relative to said flue-gas pathway.

7. The apparatus of claim 1, further comprising an air heater located downstream of said combustion chamber relative to a pathway for flue gas exiting said combustion chamber, said air heater being effective to preheat combustion air entering the combustion chamber via heat exchange with flue gas exiting said combustion chamber, said SCR reactor being located downstream of said air heater relative to said flue-gas pathway.

8. The apparatus of claim 7, further comprising an electrostatic precipitator for removing particulates entrained in said flue gas located downstream of said air heater relative to said flue-gas pathway, said SCR reactor being disposed within said electrostatic precipitator.

9. The apparatus of claim 1, further comprising an electrostatic precipitator for removing particulates entrained in said flue gas located downstream of said combustion chamber relative to a pathway for flue gas exiting said combustion chamber, said SCR reactor being disposed within said electrostatic precipitator.

10. The apparatus of claim 1, said first and second opposed boundaries being effective to guide a moving bed of catalyst particles downward through said catalyst-bed pathway from a bed inlet located at a top of said moving-bed reactor toward a bed outlet located at a base thereof.

11. The apparatus of claim 10, further comprising bed-regeneration equipment effective to regenerate spent catalyst particles exiting said bed outlet, an outlet conveyor to convey spent catalyst particles from said bed outlet to said bed-regeneration equipment for regeneration thereof, and an inlet conveyor to convey regenerated catalyst particles from said regeneration equipment to said bed inlet.

12. The apparatus of claim 11, said outlet conveyor and inlet conveyor being adapted to continuously convey catalyst particles from said bed outlet, through said regeneration equipment and to said bed inlet in a closed loop.

13. The apparatus of claim 11, said SCR reactor comprising a plurality of said moving-bed reactors arranged in parallel relative to a pathway for flue gas through the SCR reactor, wherein said outlet conveyor is adapted to convey spent catalyst particles exiting the bed outlets of all said moving-bed reactors to said regeneration equipment, and said inlet conveyor is adapted to convey regenerated catalyst particles from said regeneration equipment to the bed inlets of all said moving-bed reactors.

14. The apparatus of claim 11, at least one of said outlet conveyor and inlet conveyor comprising vibratory means to deliver vibrations to catalyst particles conveyed thereby.

15. The apparatus of claim 1, said combustion chamber being a coal-burning boiler, said fuel comprising coal.

16. The apparatus of claim 1, further comprising a bed of catalyst particles disposed in said catalyst-bed pathway, said catalyst particles comprising one or a plurality of particle species selected from the group consisting of common base-metal oxides and common base-metal salts.

17. The apparatus of claim 16, said catalyst particles being substantially devoid of sulfation-resistant metal catalyst.

18. The apparatus of claim 1, wherein the fuel comprises at least one of wood waste, bio-mass, municipal waste and trash.

19. A method to treat flue gas exiting a combustion chamber to remove $NO_x$ therein, comprising:
  providing a moving-bed reactor that comprises opposed first and second boundaries defining a substantially vertical catalyst bed pathway therebetween, said first boundary comprising a louver stack and said second boundary comprising a perforated plate, said louver stack comprising a series of vertically-spaced louvers that are inclined away from said perforated plate, said louver stack and said perforated plate being spaced apart from one another to thereby define said substantially vertical catalyst-bed pathway therebetween;
  providing a bed of catalyst particles flowing downward through said catalyst-bed pathway, guided by the opposed first and second boundaries; and
  flowing at least a portion of the flue gas exiting said combustion chamber along a pathway through said moving-bed reactor such that it travels between said vertically-spaced louvers, through said bed pathway, and then exits through apertures provided in said perforated plate.

20. The method of claim 19, wherein an air heater is provided downstream of said combustion chamber relative to a pathway of said flue gas to preheat combustion air before entering said combustion chamber via heat exchange with said flue gas, said moving-bed reactor being disposed downstream of said air heater relative to said flue-gas pathway.

21. The method of claim 20, comprising providing a plurality of said moving-bed reactors downstream of said air heater and arranged in parallel relative to said flue-gas pathway.

22. The method of claim 19, comprising providing a plurality of said moving-bed reactors arranged in parallel relative to a pathway of said flue gas therethrough.

23. The method of claim 22, wherein an electrostatic precipitator for removing particulates entrained in said flue gas is disposed downstream of said combustion chamber, and wherein said plurality of moving-bed reactors are disposed within said electrostatic precipitator.

24. The method of claim 19, further comprising delivering spent catalyst particles exiting said moving-bed reactor to regeneration equipment for regeneration thereof, and delivering regenerated catalyst particles from said regeneration equipment back into said catalyst pathway in a closed loop.

25. The method of claim 24, further comprising vibrating catalyst particles while in transit from said moving-bed reactor to said regeneration equipment, from said regeneration equipment to said moving-bed reactor, or both.

26. The method of claim 19, said combustion chamber being a coal-burning boiler, said fuel comprising coal.

27. The method of claim 19, said flue gas having a temperature in the range of 250-350° F. when it travels through said bed pathway and contacts said catalyst particles, and wherein at least 40% of $NO_x$ present in said flue gas is thereby reduced.

28. The method of claim 27, wherein at least 40% of elemental Hg present in said flue gas is thereby oxidized to a higher oxidation state.

29. The method of claim 19, said catalyst particles comprising one or a plurality of particle species selected from the group consisting of common base-metal oxides and common base-metal salts.

30. The method of claim 19, said catalyst particles being substantially devoid of sulfation resistant metal catalyst.

31. The method of claim 19, said moving-bed reactor resulting in a pressure drop of not greater than 4 inches water gauge in flue gas traveling therethrough.

32. The method of claim 19, said bed of catalyst particles flowing downward through said catalyst-bed pathway at a linear speed less than one foot per minute.

33. The method of claim 19, at least one of said first and second boundaries being sloped from vertical.

34. The method of claim 19, wherein the flue gas exiting from the combustion chamber is produced by the combustion of at least one of wood waste, bio-mass, municipal waste and trash.

* * * * *